United States Patent
Konno

(10) Patent No.: US 6,891,647 B2
(45) Date of Patent: May 10, 2005

(54) IMAGE FORMING APPARATUS AND METHOD OF CONTROLLING THE APPARATUS

(75) Inventor: Michiaki Konno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 812 days.

(21) Appl. No.: 09/932,950

(22) Filed: Aug. 21, 2001

(65) Prior Publication Data

US 2003/0038994 A1 Feb. 27, 2003

(51) Int. Cl.$^7$ ................................................. H04N 1/04
(52) U.S. Cl. ...................... 358/497; 358/496; 358/474; 358/475
(58) Field of Search .................................. 358/497, 496, 358/474, 475

(56) References Cited

FOREIGN PATENT DOCUMENTS

JP          8-278574       10/1996

*Primary Examiner*—Edward Coles
*Assistant Examiner*—Houshang Safaipour
(74) *Attorney, Agent, or Firm*—Foley & Lardner LLP

(57) ABSTRACT

A cold-cathode ray tube is adopted as an exposure lamp and the exposure lamp is always lit. When the exposure lamp exists at a standby position, a light of the exposure lamp is irradiated at a lower surface side of a control panel. By this irradiation, the liquid crystal display section of the control panel is irradiated in a state of looking bright and clear.

13 Claims, 7 Drawing Sheets

IMAGE FORMING APPARATUS AND METHOD OF CONTROLLING THE APPARATUS

BACKGROUND OF THE INVENTION

An image forming apparatus such as a copying machine optically reads an image of an document set on an document setting plate via a transparent document setting plate by moving and lighting an exposure lamp along the document setting plate. The read image is printed on a copy paper, which is an image forming medium.

As an example of the exposure lamp, there are a halogen lamp and a cold-cathode ray tube. While the halogen lamp is high in a calorific value, the cold-cathode ray tube is low in the calorific value. When this cold-cathode ray tube is used, thermal effects (deformation, fracture and the like) on the surrounding parts can be prevented.

However, the cold-cathode ray tube requires about five minutes from the time it is lit until the quantity of light is sufficiently stabilized. For this reason, when the cold-cathode ray tube is adopted as an exposure lamp, in order to prevent a delay in the start of reading, the cold-cathode ray tube is lit even in a standby time except for a reading time.

Nevertheless, when the cold-cathode ray tube is lit in a standby time, on the occasion when a user opens the document setting plate cover in order to set an document on the document setting plate, the light of the cold-cathode ray tube flows into user's eyes via the document setting plate so that a user feels dazzled.

BRIEF SUMMARY OF THE INVENTION

An object of the invention is to provide an image forming apparatus and a method of controlling the apparatus, wherein thermal effects on the surrounding parts of an exposure lamp can be prevented and a quick reading can be performed without having a user felt dazzled, and moreover, the exposure lamp can be also used for the purpose of illuminating a control panel.

The image forming apparatus of the invention comprises:

an document setting plate for mounting an document;

an exposure lamp, which is always lit and stands by at a position where a light by the lighting is not lit on the document setting plate, and which is movably provided along the document setting plate from the standby position;

a reading section which moves the exposure lamp and optically reads an image of the document mounted on the document setting plate via the document setting plate;

a print section which prints the image to be read by the each reading section on an image forming medium; and a control panel to be illuminated at a lower surface side by the light of the exposure lamp when the exposure lamp exists at the standby position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] Now, a first embodiment of the invention will be described with reference to the drawings.

Figure 1:
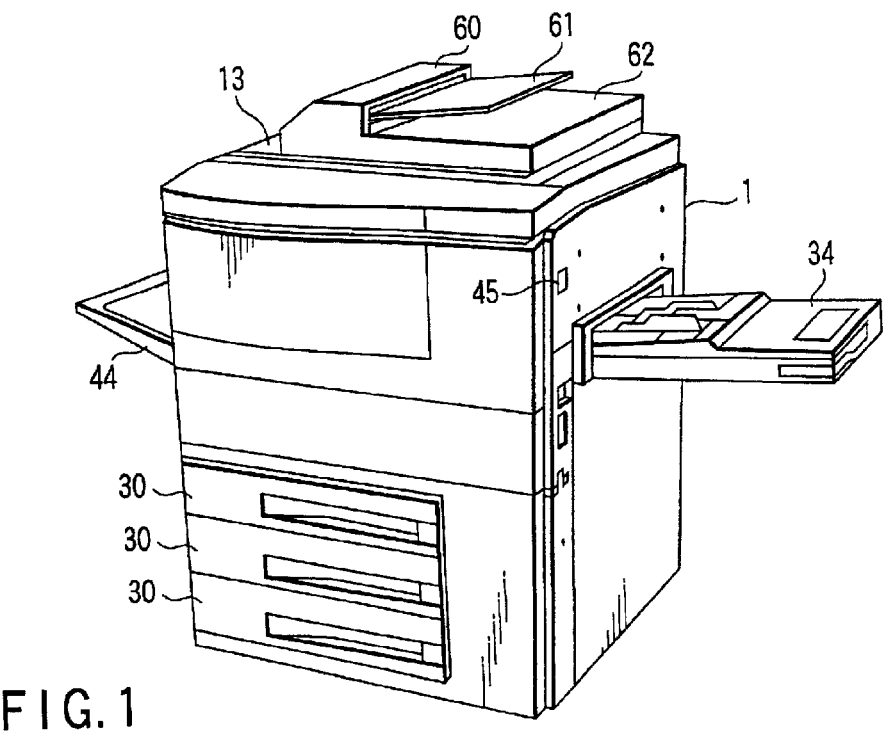
FIG. 1 is a view showing an external appearance of an apparatus according to a first embodiment of the invention.
Figure 2:
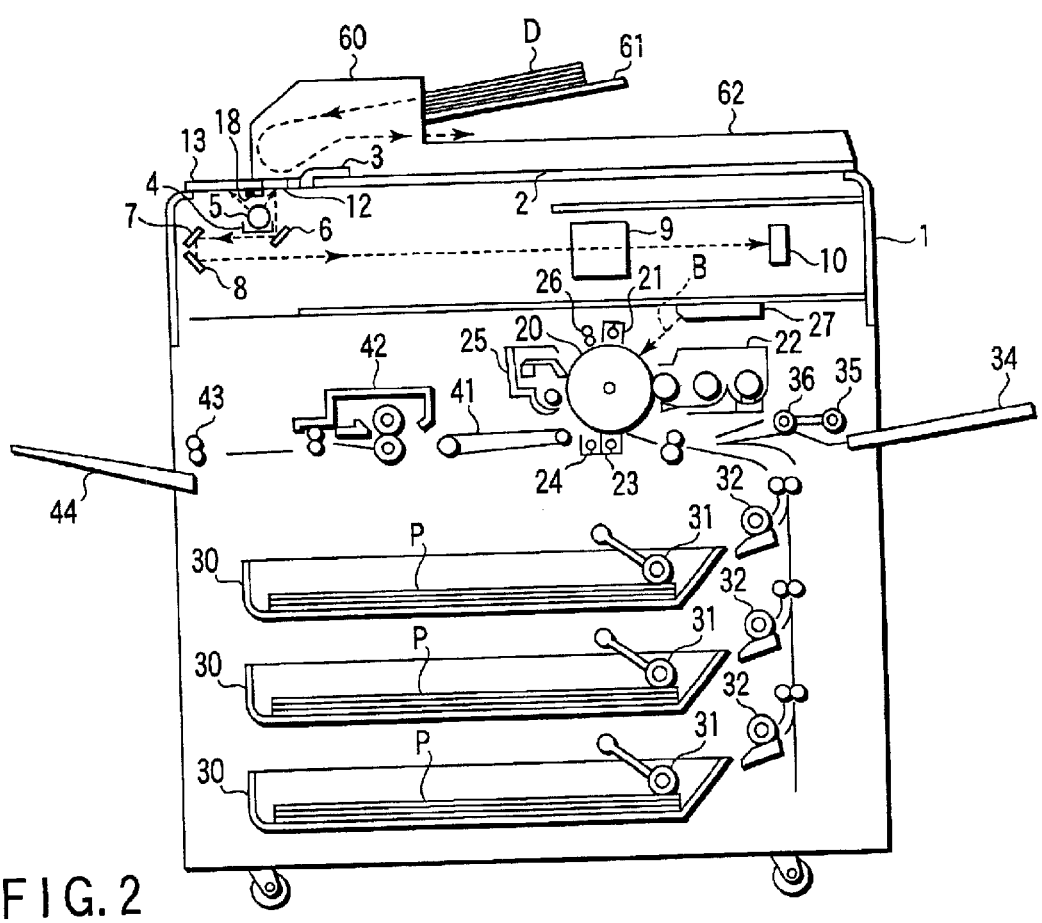
FIG. 2 is a view showing a constitution of the inside of the apparatus according to the first embodiment.

As shown in FIG. 1 and FIG. 2, a transparent document setting plate (glass plate) 2 for mounting an document is provided on an upper surface portion of a main body 1, and a cover 3 is provided on the document setting plate 2 in such a manner as to flexibly open and close.

Figure 3:
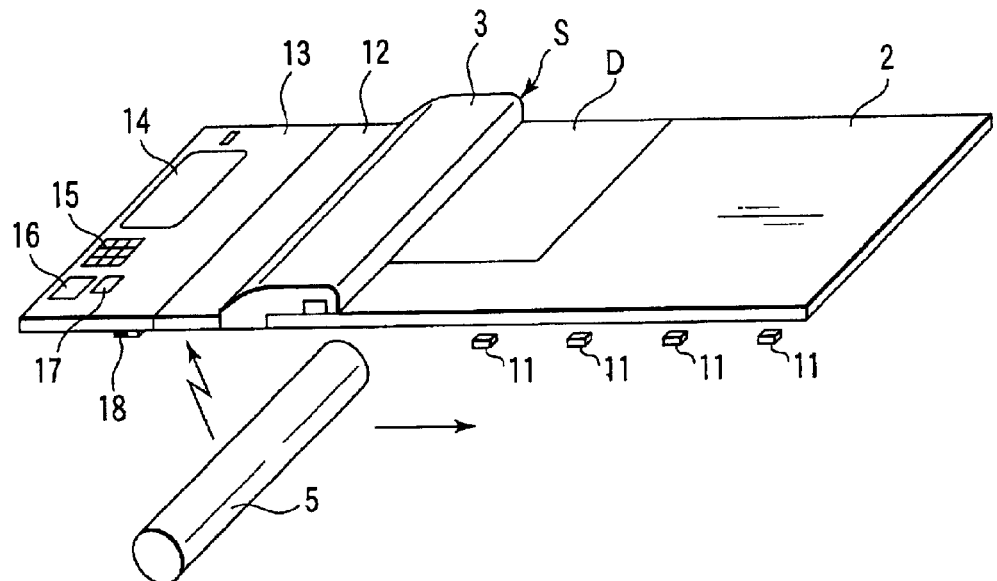
FIG. 3 is a view showing a constitution of an document setting plate and a surrounding section thereof according to the first embodiment.
Figure 4:
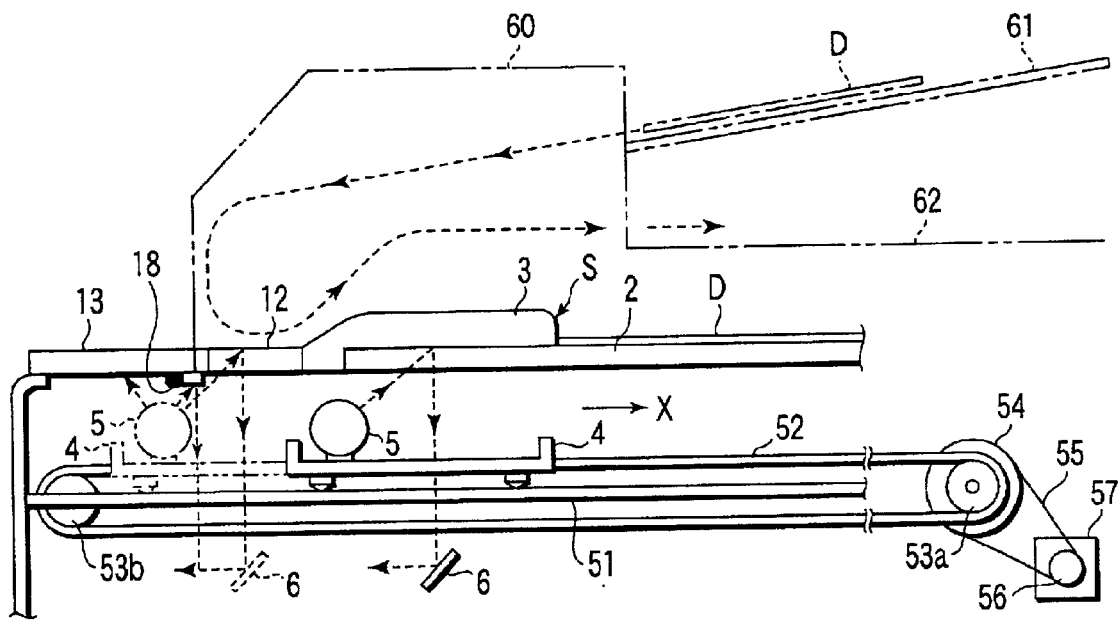
FIG. 4 is a view showing a constitution of essential portion according to the first embodiment.

As shown in FIG. 3 and FIG. 4, one side portion of the document setting plate 2 is provided with an indicate portion 3. A stepped portion between this indicator portion 3 and the document setting plate 2 is made as a reference position S for setting the document. An document D is set by fitting to this reference position S. That is, with the reference position S as a boundary, the indicator portion 3 side (shown in the left side) is a non-document mounting area and the remaining side (shown in the right side) is an document mounting area.

The lower surface side of the document setting plate 2 is provided with a plurality of document sensors 11. By these sensors 11, the existence of the document D on the document setting plate 2 and the size thereof are optically detected.

The lower surface side of the document setting plate 2 is provided with a carriage 4, and the carriage 4 is provided with an exposure lamp 5. Exposure means is formed by these carriage 4 and exposure lamp 5. The carriage 4 can move (reciprocate) along the lower surface of the document setting plate 2. While the carriage 4 moves from the non-document mounting area to the document mounting area, the exposure lamp 5 is lit so that the document D mounted on the document setting plate 2 is exposed.

By this exposure, a reflected light image of the document D is obtained, and the image is projected to image signal output means, for example, a CCD (Charge Coupled Device) 10 by reflection mirrors 6, 7 and 8 and a variable power lens block 9. The CCD 10 has a large number of photoelectric conversion elements in light receiving areas and line-scans these light receiving areas, and by repeating the line scanning operation, outputs an image signal corresponding to the image of the document D.

The image signal to be outputted from the CCD 10 is amplified and converted into a digital signal, and after the digital signal is suitably processed at an image processing portion, it is supplied to a laser unit 27. The laser unit 27 emits a laser beam B according to the input signal.

The carriage 4 is movably mounted on a rail 51. The carriage 4 is connected to a wire 52, and the wire 52 is hooked across a drive pulley 53$a$ and an idler pulley 53$b$. The drive pulley 53$a$ is connected to a speed reducing pulley 54, and the speed reducing pulley 54 is connected to a pulley 56 of a scan motor 57 via a timing belt 55. As the scan motor 57, a pulse motor is used. Depending on the supply number (step number) of drive voltage pulses for the scan motor 57, the shifting position of the carriage 4 is controlled.

At an adjacent position to the indicator 3 of the document setting plate 2, a window 12 for reading the document is provided. The window 12 has a dimensional configuration corresponding to the longitudinal length of the indicator 3.

On the document setting plate 2, the indicator 3 and the window 12, an automatic document feeder (ADF) 60 serving also as the document setting plate cover is provided in such a manner as to flexibly open and close. The automatic document feeder 60 comprises a tray 61 for mounting the document, and feeds a plurality of documents D set on the tray 61 to the window 12 one by one to pass through on the window 12 and discharges the documents D thus having passed through on the window to a tray 62.

Figure 5:
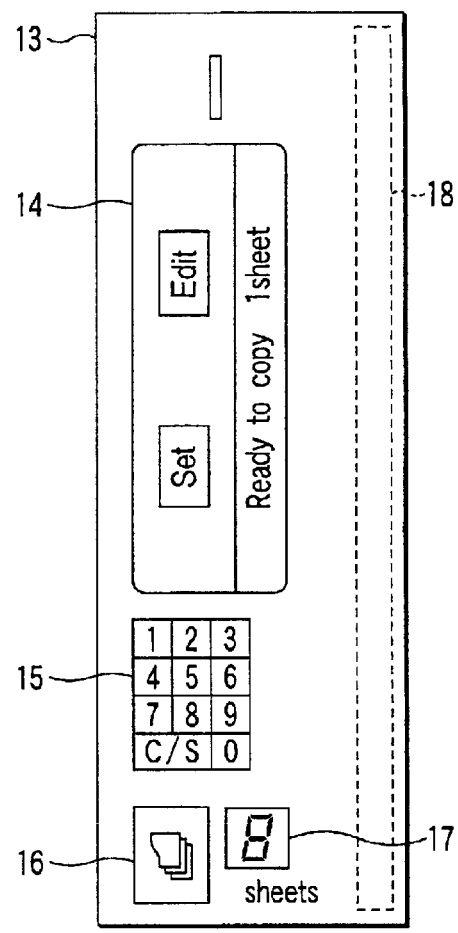
FIG. 5 is a view showing a constitution of a control panel according to the first embodiment.

On the upper surface portion of the main body 1, a control panel 13 for setting operational conditions is provided at a position on which the automatic document feeder 60 does not overlay, and at a position adjacent to the window 12. The control panel 13 comprises, as shown in FIG. 5, a liquid crystal display section 14, a ten keys 15 for inputting numerical values, a print key 16 and an LED display section 17. The liquid crystal display section 14 is of a touch panel system capable of inputting information and can display and set various operational conditions of the apparatus. The LED display section 17 displays information relative to the operations of the apparatus, for example, the number of prints by a light emitting diode.

A color reference member 18 for correcting shading is provided at the lower surface of the control panel 13. The color reference member 18 is constituted by a black color reference plate and a white color reference plate, and has a dimensional configuration corresponding to the longitudinal length of the indicator 3.

The carriage 4 is capable of moving to the lower surface side of the control panel 13 as well as stopping. When the carriage 4 exists at the lower surface side of the control panel 13, the light of the exposure lamp 5 is irradiated at the control panel 13, the color reference member 18 and the window 12, but not at the document setting plate 2. On this occasion, the position of the exposure lamp 5 is referred to as a standby position.

The light to be irradiated at the control panel 13 is made as a back light for the liquid crystal display section 14, and illuminates the liquid crystal display section 14 in such a manner as to look bright and clear, and transmission-illuminates the ten keys 15 and the print key 16.

The light irradiated at the color reference member 18 is reflected by the color reference member 18 and becomes a light for shading correction.

The light irradiated at the window 12 exposes the document D, which passes through the window 12 via the window 12.

Note that, a first standby position and a second standby position are prepared at the standby position of the exposure lamp 5. At the first standby position, from among the reflected lights generated at the control panel 13, the color reference member 18 and the window 12, respectively, the reflected light generated only at the color reference member 18 is guided to the CCD 10 as a shading correction use by the reflection mirrors 6, 7 and 8 and the variable power lens block 9. At the second standby position, from among the reflected lights generated at the control panel 13, the color reference member 18 and the window 12, respectively, the reflected light generated only at the document D on the window 12 is guided to the CCD 10 as an image reading use by the reflection mirrors 6, 7 and 8 and the variable power lens block 9.

On the other hand, at approximately the central portion inside the main body 1, a photosensitive drum 20 is rotatably provided.

A charging device 21, a developing device 22, a transferring device 23, a peeling-off device 24, a cleaner 25, and a residual charge eliminator 26 are provided in that order around this photosensitive drum 20. A laser beam B emitted form the above laser unit 27 is irradiated at the surface of the photosensitive drum 20 via a space between the charging device 21 and the developing device 22.

A plurality of paper feeding cassettes 30 are provided at the bottom of the inside of the main body 1. These paper feeding cassettes 30 contain a large number of copy papers P having different size from each other as image forming media. When the print key 16 is pushed, the copy paper P is taken out one by one from any one of the paper feeding cassettes 30. For taking out the copy paper, a pick up roller 31 is provided for each paper feeding cassette 30. The copy paper P thus taken out is separated from the paper feeding cassette 30 respectively by a separator 32 and sent to a resist roller 33. The resist roller 33 feeds the copy paper P between the photosensitive drum 20 and the transferring device 23 at a timing of taking into consideration the rotation of the photosensitive drum 20.

The charging device 21 charges, electrostatic charge on the surface of the photosensitive drum 20 by applying high voltage to the photosensitive drum 20. The laser beam B emitted from the laser unit 27 is irradiated at the surface of the photosensitive drum 20 which has finished being charged. The laser unit 27 performs a main scanning (line scanning) of the surface of the photosensitive drum 20 in one direction, and by performing a sub scanning in which the main scanning is repeated accompanied by the rotation of the photosensitive drum 20, it forms an electrostatic latent image corresponding to the image read from the document D on the surface of the photosensitive drum 20.

The electrostatic latent image on the photosensitive drum 20 is visualized by the developing device 22 by receiving developer (toner). The visualized image is transferred on the copy paper P by the transferring device 23. The copy paper P on which the visualized image was transferred is peeled off from the photosensitive drum 20 by the peeling-off device 24. The surface of the photosensitive drum 20 from which the copy paper P was peeled off is left with the developer and charge. The residual developer is eliminated by the cleaner 25. The residual charge is eliminated by the residual charge eliminator 28.

The copy paper P which was peeled off from the photosensitive drum 20 is conveyed to a fixing device 42 by a conveying belt 41. The fixing device 42 fixes a transferred image on the copy paper P by heat. The copy paper P which has finished being fixed with the image is discharged to a tray 44 by a paper discharge roller 43.

At a side of the main body 1, a power switch 45 is provided.

Figure 6:
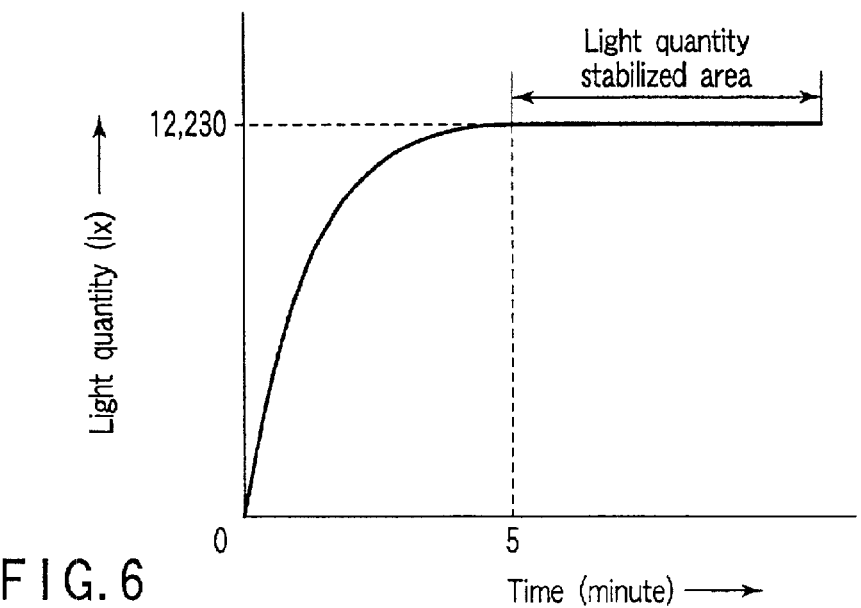
FIG. 6 is a view showing a characteristic of a cold-cathode ray tube according to each embodiment.

As the exposure lamp 5, the cold-cathode ray tube is used. Due to the use of the cold-cathode ray tube, the thermal effects (deformation, fracture and the like) on the surrounding parts of the exposure lamp 5 can be prevented. However, the cold-cathode ray tube requires about five minutes from the time it is lit until the quantity of light is sufficiently stabilized as shown in FIG. 6. By taking into consideration this delay in the build up of the quantity of light, the exposure lamp 5 is always lit when the power switch 45 is turned on. By this continuous lighting, the delay in starting the exposure for the document D is prevented.

Figure 7:
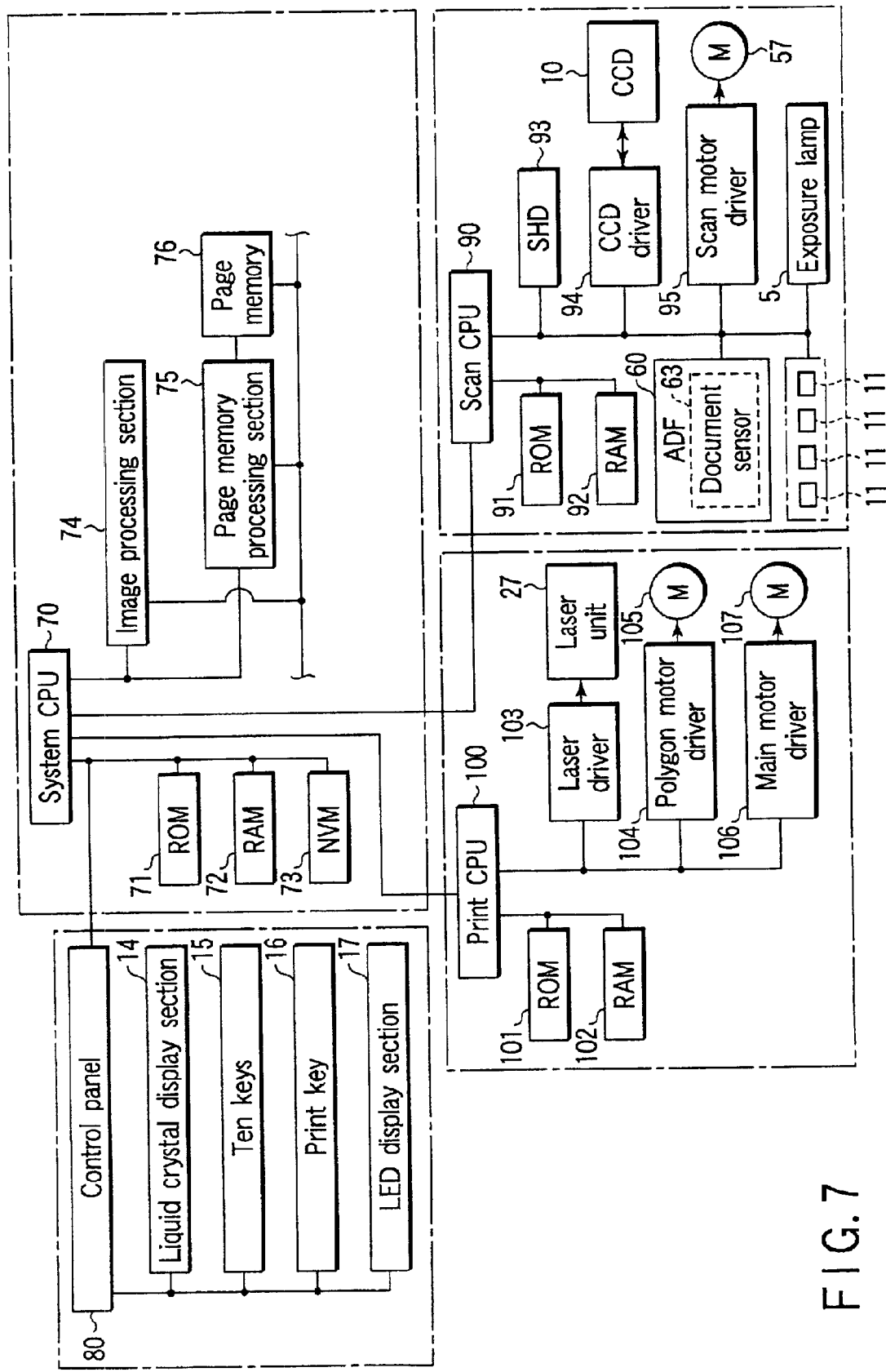
FIG. 7 is a block diagram of a control circuit according to the first embodiment.

The entire control circuit of the apparatus is shown in FIG. 7.

A system CPU 70, a control panel CPU 80, a scan CPU 90 and a print CPU 100 are mutually connected. The system CPU 70 collectively controls the control panel CPU 80, the scan CPU 90 and the print CPU 100.

Further, the system CPU 70 is connected to a control program storage ROM 71, a data storage RAM 72, an NVM 73 and an image processing portion 74.

The control panel CPU 80 is connected to the liquid crystal display section 14, the ten keys 15, the print key 16 and the LED display section 17.

The scan CPU 90 is connected to a control program storage ROM 91, a data storage RAM 92, a shading correction section (SHD) 93, a CCD driver 94, a scan motor driver 95, the exposure lamp 5, the automatic document feeder 60, each document sensor 11 and the like. The CCD driver 94 drives the CCD 10. The scan motor driver 95 drives the scan motor 57. The automatic document feeder 60 is provided with an document sensor 63 for detecting the document D to be set on the tray 61 and the size thereof.

With this scan CPU 90 as a main component, a first reading section and a second reading section are formed. The first reading section moves the exposure lamp 5 and optically reads the image of the document D mounted on the document setting plate 2 via the document setting plate 2. The second reading section operates the automatic document feeder 60 in a state of holding the exposure lamp 5 at the reference position, and optically reads the image of the document D, which passes through on the winder 12, via the window 12.

The print CPU 100 is connected to a control program storage ROM 101, a data storage RAM 102, a laser driver 103, a polygon motor driver 104, a main motor driver 106 and a sorter 44. The laser driver 103 drives the laser unit 27. The polygon motor driver 104 drives a polygon motor which is a driving source of a polygon mirror for scanning the laser beam B on the photosensitive drum 20. The main motor driver 106 drives a main motor 107 which is a driving source of the photosensitive drum 20, a sheet paper conveying mechanism and the like.

With this print CPU 100 as a main component, a print portion for printing the image, which is read in the above first and second reading portions, on the copy paper P is formed.

Figure 8:
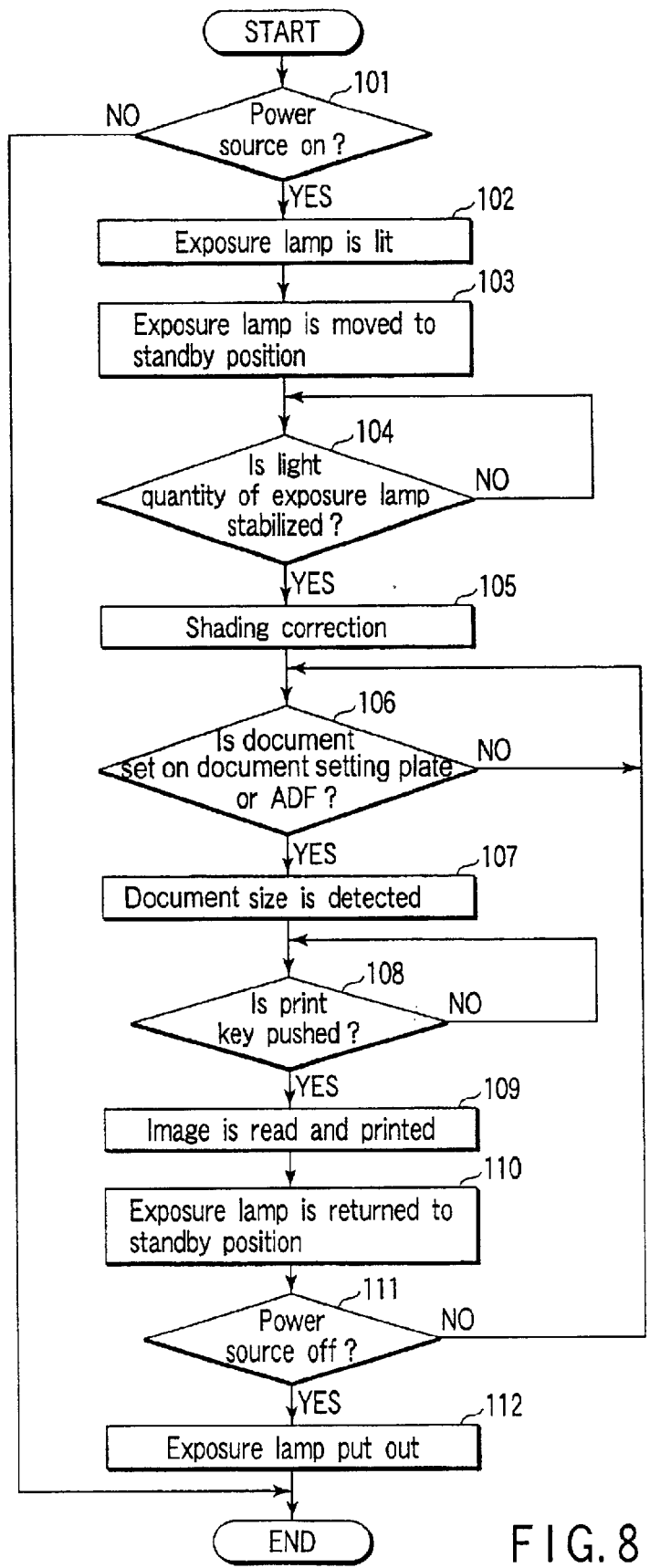
FIG. 8 is a flowchart for explaining an operation according to the first embodiment.

Next, the operation will be described with reference to the flowchart of FIG. 8.

When the power switch 45 is turned on (YES of step 101), the exposure lamp 5 is lit (step 102), and the exposure lamp 5 is moved to the first standby position (step 103).

When the exposure lamp 5 exists at the first standby position, the light of the exposure lamp 5 is irradiated at the lower surface of the control panel 13. By this irradiation, the liquid crystal display portion 14 is irradiated in a state of looking bright and clear, and the ten keys 15 and the print key 16 are transmission-illuminated.

Also, when the exposure lamp 5 exists at the first standby position, the light of the exposure lamp 5 is irradiated at the color reference member 18, and the reflected light thereof is guided to the CCD 10. In this state, about the time when the quantity of light of the exposure lamp 5 is stabilized (YES of step 104), that is, when about five minutes elapse since the exposure lamp 5 was lit, the shading correction for correcting the irregularity of the output of the CCD 10 is performed (step 105).

When the automatic document feeder 60 is opened upward and the document D is set on the document setting plate 2, the setting state thereof is detected by document sensors 11 (YES of step 106), and the size of the document D set as above is detected by document sensors 11 (step 107). On this occasion, even when the automatic document feeder 60 is opened upward, since the exposure lamp 5 exists at the first standby position, the light of the exposure lamp 5 is not irradiated at the document setting plate 2. Hence, a user does not feel dazzled.

When the automatic document feeder 60 is closed and the print key 16 is turned on (YES of step 108), forward movement of the exposure lamp 5 is started. At this forward movement time, the image of the document D is read by the light of the exposure lamp 5, and the read image is printed on the copy paper P via the photosensitive drum 20 (step 109).

That is, the laser beam B, which is modulated based on the read image, is emitted from the laser unit 27. By this laser beam B, the electrostatic latent image is formed on the surface of the photosensitive drum 20. This electrostatic latent image is developed to become a visualized image, and this visualized image is transferred on the copy paper P. The copy paper P which has finished transferring is peeled off from the photosensitive drum 20 and is discharged to the tray 44 via the fixing device 42.

During forward movement of the exposure lamp 5, the light of the exposure lamp 5 does not reach the control panel 13 so that the control panel 13 is not irradiated. In this case, though the display of the liquid crystal display section 14 becomes difficult to look, the display of the number of prints is continued by a light emitting diode of the LED display section 17.

The exposure lamp 5 after the forward movement returns to the first standby position by moving backward (step 110). When the exposure lamp 5 returns to the first standby point, the light of the exposure lamp 5 is again irradiated at the lower surface of the control panel 13. By this irradiation, the liquid crystal display section 14 is irradiated in a state of looking bright and clear, and the ten keys 15 and the print key 16 are transmission-illuminated.

On the other hand, when one or a plural sheets of the document D are set on the tray 61 of the automatic document feeder 60, the setting state thereof is detected by the document sensor 63 (YES of step 106), and the size of the document D set as above is detected by the document sensor 63 (step 107).

When the print key 16 is turned on (YES of step 108), the exposure lamp 5 is moved to the second standby position, and the automatic document feeder 60 starts operating so as to feed the document D to the window 12 one by one. The document D thus fed passes through the window in a state of its surface being opposite to the window 12. The document D thus passed through is discharged to the tray 62 of the automatic document feeder 60.

When the exposure lamp 5 exists at the second standby position, the light of the exposure lamp 5 is irradiated at the lower surface of the control panel 13. By this irradiation, the liquid crystal display section 14 is illuminated in a state of looking bright and clear, and the ten keys 15 and the print key 16 are transmission-illuminated.

Also, when the exposure lamp 5 exists at the second standby position, the light of the exposure lamp 5 is irradiated at the document D on the window 12 via the window 12, and the reflected light thereof is guided to the CCD 10. In this way, the image of the document D which passes through on the window 12 is read by the light of the exposure lamp 5, and the read image is printed on the copy paper P via the photosensitive drum 20 (step 109).

When the power switch 45 is turned off (YES of step 111), the exposure lamp 5 is put out (step 112).

As described above, by using the cold-cathode ray tube having a low calorific value as the exposure lamp 5, the thermal effects (deformation, fracture and the like) on the surrounding parts (including the control panel 13) of the exposure lamp 5 can be prevented.

When the cold-cathode ray tube is used as the exposure lamp 5, though about five minutes are required from the time the exposure lamp 5 is lit until its quantity of light is sufficiently stabilized, since the exposure lamp 5 is always lit, when the print key 16 is turned on, the reading is immediately started. That is, a quick reading is possible without having a standby time.

When the exposure lamp 5 is always lit, on the occasion when users open upward the automatic document feeder 60 in order to set the document D on the document setting plate 2, it is feared that the light of the exposure lamp 5 flows into the eyes of a user and the user feels dazzled. However, since the exposure lamp 5 stands by at the positions (first and second standby positions) of the document setting plate 2 at which the light is not irradiated, the light of the exposure lamp 5 does not flow into the eyes of users and users do not feel dazzled.

Furthermore, when the exposure lamp 5 exists at the first and the second standby positions, since the light of the exposure lamp 5 is irradiated at the lower surface of the control panel 13, special lighting fixtures are not required and yet the liquid crystal display portion 14 can be illuminated in a state of looking bright and clear, and the ten keys 15 and the print key 16 can be transmission-illuminated. Because special lighting fixtures are not required, the reduction in cost can be attempted.

[2] A second embodiment of the invention will be described below with reference to the drawings.

Figure 9:
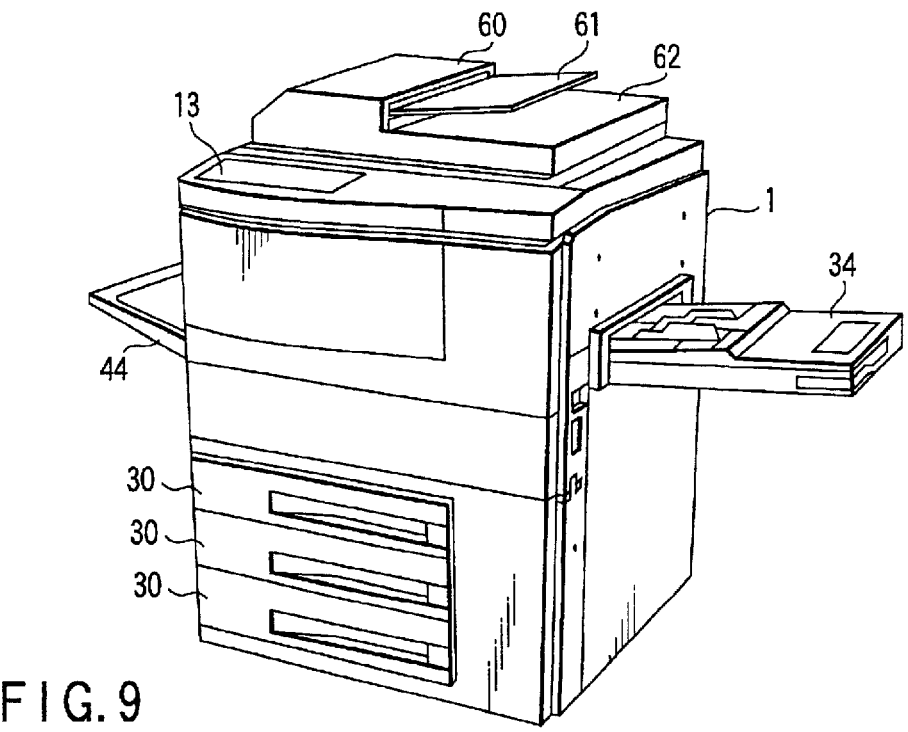
FIG. 9 is a view showing an external appearance of an apparatus according to a second embodiment of the invention.

As shown in FIG. 9, on the upper surface portion of a main body 1, an operation condition setting control panel 13 is provided at a position on which an automatic document feeder 60 does not overlay and also at a position where the light of an exposure lamp 5 does not reach.

Figure 10:
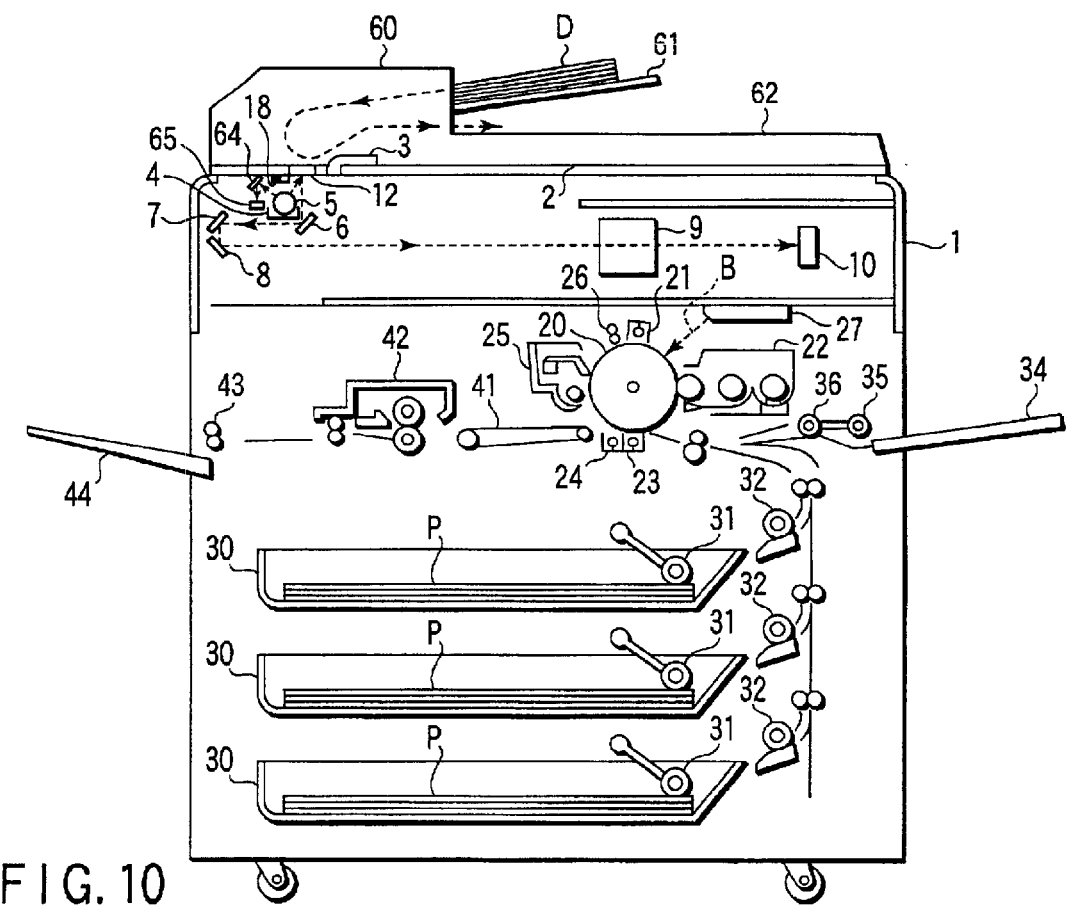
FIG. 10 is a view showing a constitution of the inside of the apparatus according to the second embodiment.
Figure 11:
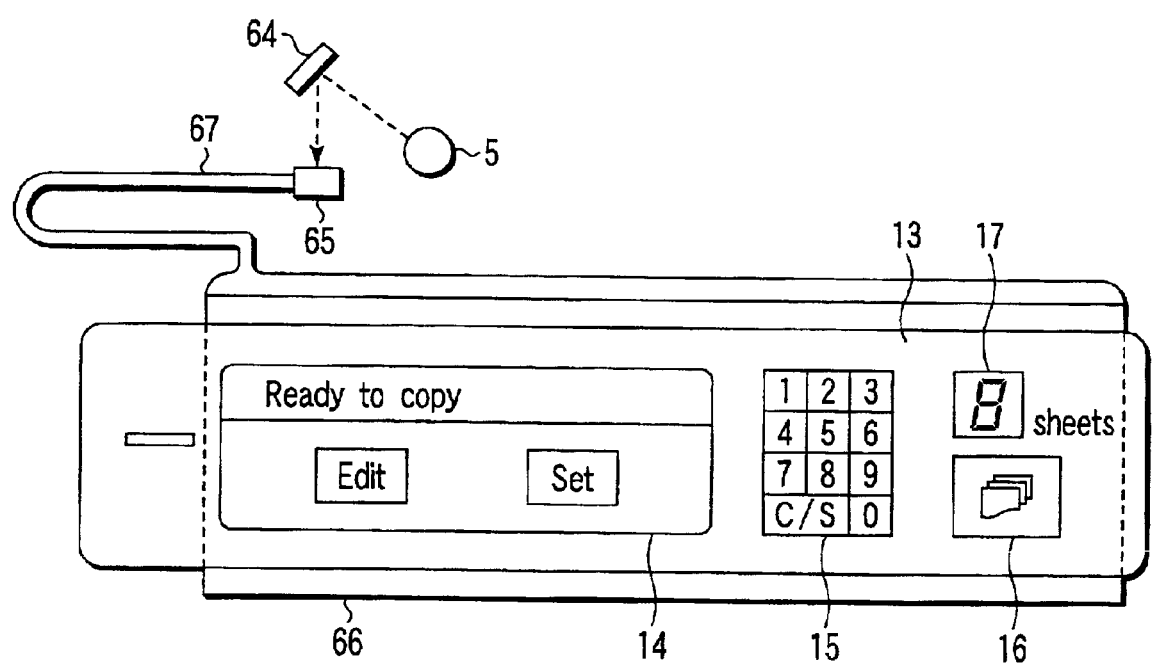
FIG. 11 is a view showing a constitution of a control panel according to the second embodiment.

In this case, as shown in FIG. 10, when the exposure lamp 5 exists at first and second standby positions, the light of the exposure lamp 5 is irradiated at a light receiving portion 65 via a reflection mirror 64. Also, as shown in FIG. 11, a back light panel 66 is provided by opposing to the lower surface of the control panel 13. The light which the light receiving portion 65 received is guided to the back light panel 66 by an optical fiber 67. The back light panel 66 irradiates the light to be guided by the optical fiber 67 toward the lower surface of the control panel 13.

The other constitution is the same as that of the first embodiment. Hence, the description thereof will be omitted.

Since the cold-cathode ray tube having a low calorific value is used as the exposure lamp 5, the thermal effects (deformation, fracture and the like) on the surrounding parts (including the control panel 13) of the exposure lamp 5 can be prevented.

When the cold-cathode ray tube is used as the exposure lamp 5, though about five minutes are required from the time the exposure lamp 5 is lit until its quantity of light is sufficiently stabilized, since the exposure lamp 5 is always lit, when the print key 16 is turned on, the reading is immediately started. That is, a quick reading is possible without having a standby time.

When the exposure lamp 5 is always lit, on the occasion when users open upward the automatic document feeder 60 in order to set the document D on the document setting plate 2, it is feared that the light of the exposure lamp 5 flows into the eyes of a user and the user feels dazzled. However, since the exposure lamp 5 stands by at the positions (first and second standby positions) of the document setting plate 2 at which the light is not irradiated, the light of the exposure lamp 5 does not flow into the eyes of a user and the user does not feel dazzled.

Furthermore, when the exposure lamp 5 exists at the first and the second standby positions, since the light of the exposure lamp 5 is irradiated at the lower surface of the control panel 13 via the reflection mirror 64, the light receiving portion 65, the optical fiber 67 and the back light panel 66, special lighting fixtures are not required and yet the liquid crystal display section 14 can be illuminated in a state of looking bright and clear, and the ten key 15 and the print key 16 can be transmission-illuminated. Because special lighting fixtures are not required, the reduction in cost can be attempted.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An image forming apparatus comprising:
    an document setting plate for mounting an document copy;
    an exposure lamp which is always lit and stands by at a position where a light of the lighting is not irradiated at said document setting plate, and which is movably provided along said document setting plate from the standby position;
    a reading section which moves said exposure lamp and optically reads an image of the document mounted on said document setting plate via said document setting plate;
    a print section which prints an image to be read by said reading section on an image forming medium; and
    a control panel to be illuminated at a lower surface side by the light of the exposure lamp when said exposure lamp exists at said standby position.

2. The apparatus according to claim 1, wherein said exposure lamp is a cold-cathode ray tube.

3. The apparatus according to claim 1, wherein said control panel comprises a liquid crystal display section.

4. The apparatus according to claim 1, wherein said control panel comprises a liquid crystal display section, a ten keys, a print key and an LED display section.

5. An image forming apparatus comprising:

an document setting plate for mounting an document copy;

an document reading window;

an automatic document feeder which feeds the document to said document reading window and allows it to pass through on the document reading window;

an exposure lamp which is always lit and stands by at a position where a light of the lighting is irradiated at said window but not irradiated at said document setting plate, and which is movably provided along said document setting plate from the standby position;

a first reading section which moves said exposure lamp and optically reads an image of the document mounted on said document setting plate via said document setting plate;

a second reading section which operates said automatic document feeder in a state of holding said exposure lamp at said reference position and optically reads the image of the document passing through on said window via the window;

a print section which prints an image to be read by said each reading section on an image forming medium; and a control panel to be illuminated at a lower surface side by the light of the exposure lamp when said exposure lamp exists at said standby position.

6. The apparatus according to claim 5, wherein said exposure lamp is a cold-cathode ray tube.

7. The apparatus according to claim 5, wherein said control panel comprises a liquid crystal display section.

8. The apparatus according to claim 5, wherein said control panel comprises a liquid crystal display section, a ten keys, a print key and an LED display section.

9. The apparatus according to claim 5, wherein said control panel is provided adjacent to said window.

10. An image forming apparatus comprising:

an document setting plate for mounting an document;

an document reading window;

an automatic document feeder which feeds the document to said document reading window and allows it to pass through on the document reading window;

an exposure lamp which is always lit and stands by at a position where a light of the lighting is irradiated at said window but not irradiated at said document setting plate, and which is movably provided along said document setting plate from the standby position;

a first reading section which moves said exposure lamp and optically reads an image of the document mounted on said document setting plate via said document setting plate;

a second reading section which operates said automatic document feeder in a state of holding said exposure lamp at said reference position and optically reads the image of the document passing through on said window via the window;

a print section which prints an image to be read by said each reading section on an image forming medium;

a control panel;

a light receiving section which receives the light of the exposure lamp when said cold-cathode ray tube exists at said standby position;

a back light panel provided opposing to a lower surface of said control panel; and an optical fiber which guides the light received by said light receiving section to said back light panel.

11. The apparatus according to claim 10, wherein said exposure lamp is a cold-cathode ray tube.

12. The apparatus according to claim 10, wherein said control panel comprises a liquid crystal display section.

13. The apparatus according to claim 10, wherein said control panel comprises a liquid crystal display section, a ten keys, a print key and an LED display portion.

* * * * *